United States Patent
Hiraiwa (10) Patent No.: US 10,922,048 B2
(45) Date of Patent: Feb. 16, 2021

(54) SOUND INPUT/OUTPUT DEVICE FOR VEHICLE

(71) Applicant: Toyota Jidosha Kabushiki Kaisha, Toyota (JP)

(72) Inventor: Hiroshi Hiraiwa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/666,777

(22) Filed: Oct. 29, 2019

(65) Prior Publication Data
US 2020/0133626 A1 Apr. 30, 2020

(30) Foreign Application Priority Data
Oct. 31, 2018 (JP) .............................. JP2018-205671

(51) Int. Cl.
| | |
|---|---|
| *G06F 3/16* | (2006.01) |
| *G10L 25/51* | (2013.01) |
| *H04R 1/02* | (2006.01) |
| *G06K 9/00* | (2006.01) |

(52) U.S. Cl.
CPC ......... *G06F 3/165* (2013.01); *G06K 9/00845* (2013.01); *G10L 25/51* (2013.01); *H04R 1/025* (2013.01); *H04R 2499/13* (2013.01)

(58) Field of Classification Search
CPC .. G06K 9/00845; H04B 1/082; H04B 1/3822; G06F 3/165; H04R 1/025; H04R 2499/13; A61B 5/18; B60K 28/02; B60K 28/06; B60W 60/0015; B60W 60/0016

USPC ........ 381/86, 110; 455/345; 340/573.1, 575, 340/576
See application file for complete search history.

(56) References Cited

U.S. PATENT DOCUMENTS

| | | | |
|---|---|---|---|
| 8,031,880 B2* | 10/2011 | Holmi ..................... | H04S 7/307 381/86 |
| 2006/0153398 A1* | 7/2006 | Deetz ...................... | H03G 3/32 381/86 |
| 2013/0314536 A1* | 11/2013 | Frank .................. | H04N 5/2257 348/148 |
| 2015/0249886 A1* | 9/2015 | Haylett ................ | G10K 11/178 381/71.4 |
| 2017/0177959 A1* | 6/2017 | Boos ...................... | G08B 21/06 |

(Continued)

FOREIGN PATENT DOCUMENTS

| | | |
|---|---|---|
| JP | 2006-094389 A | 4/2006 |
| JP | 2016-133989 A | 7/2016 |

*Primary Examiner* — Xu Mei
(74) *Attorney, Agent, or Firm* — Dinsmore & Shohl LLP (57) ABSTRACT

A sound input/output device for a vehicle includes: sound collecting portions that are provided within a vehicle cabin and that collect voices of vehicle occupants; outputting portions that are provided within the vehicle cabin, and that output sound or images to respective seats; an awakeness degree judging section that judges degrees of awakeness of the vehicle occupants; and an output control section that, in a case in which it is judged, based on a voice collected by the sound collecting portion, that content relating to the vehicle or a vehicle periphery has been spoken, causes information relating to the vehicle or the vehicle periphery to be outputted from each outputting portion that corresponds to a seat in which a vehicle occupant, whose degree of awakeness is higher than a predetermined value, sits.

6 Claims, 7 Drawing Sheets

(56) References Cited

U.S. PATENT DOCUMENTS

2017/0202501 A1* 7/2017 Kuwahara .......... G06K 9/00845
2018/0167044 A1* 6/2018 Kanagaraj ................ H03G 3/20

* cited by examiner

SOUND INPUT/OUTPUT DEVICE FOR VEHICLE

CROSS-REFERENCE TO RELATED APPLICATION

This application is based on and claims priority under 35 USC § 119 from Japanese Patent Application No. 2018-205671 filed on Oct. 31, 2018, the disclosure of which is incorporated by reference herein.

BACKGROUND

Technical Field

The present disclosure relates to a sound input/output device for a vehicle.

Related Art

Japanese Patent Application Laid-Open (JP-A) No. 2006-94389 discloses an in-vehicle conversation assisting device having sound collecting/emitting elements that can switch between microphones and speakers.

In the technique of JP-A No. 2006-94389, conversation within a vehicle is assisted by the sound collecting/emitting elements being switched to microphones or speakers as needed. By the way, it is assumed that there will be cases in which, in order for a vehicle occupant to obtain information regarding the vehicle or the periphery of the vehicle, the vehicle occupant will interactively talk with a system installed in the vehicle. In such a case, there is the possibility that this will disturb a vehicle occupant having a low degree of awakeness, such as a vehicle occupant who is sleeping or the like.

SUMMARY

In view of the above-described circumstances, an object of the present disclosure is to provide a sound input/output device for a vehicle that can ensure the comfort of the vehicle occupants.

A sound input/output device for a vehicle relating to a first aspect of the present disclosure includes: sound collecting portions that are provided within a vehicle cabin and that collect voices of vehicle occupants; outputting portions that are provided within the vehicle cabin, and that output sound or images to respective seats; an awakeness degree judging section that judges degrees of awakeness of the vehicle occupants; and an output control section that, in a case in which it is judged, based on a voice collected by the sound collecting portion, that content relating to the vehicle or a vehicle periphery has been spoken, causes information relating to the vehicle or the vehicle periphery to be outputted from each outputting portion that corresponds to a seat in which a vehicle occupant, whose degree of awakeness is higher than a predetermined value, sits.

In the sound input/output device for a vehicle relating to the first aspect of the present disclosure, the sound collecting portions and the outputting portions are provided within the vehicle cabin. The voices of the vehicle occupants are collected by the sound collecting portions, and sound or images are outputted to the respective seats by the outputting portions. Further, the degrees of awakeness of the vehicle occupants are judged by the awakeness degree judging section. In a case in which it is judged that content relating to the vehicle or the vehicle periphery has been spoken, the output control section causes information relating to the vehicle or the vehicle periphery to be outputted to a vehicle occupant from an outputting portion. Due thereto, information relating to the vehicle or the vehicle periphery can be obtained merely by a vehicle occupant speaking, without carrying out a special operation.

Further, the output control section causes the information to be outputted to only a vehicle occupant, whose degree of awakeness judged by the awakeness degree judging section, is higher than a predetermined value. Due thereto, disturbing of a vehicle occupant who has a low degree of awakeness, such as a vehicle occupant who is sleeping or the like, can be suppressed.

In a sound input/output device for a vehicle relating to a second aspect of the present disclosure, in the first aspect, the output control section causes the information relating to the vehicle or the vehicle periphery to be outputted by a voice from each outputting portion that corresponds to a seat in which a vehicle occupant, whose degree of awakeness is higher than the predetermined value, sits, and causes reverse phase sound to be outputted from each outputting portion that corresponds to a seat in which a vehicle occupant, whose degree of awakeness is lower than the predetermined value, sits.

In the sound input/output device for a vehicle relating to the second aspect of the present disclosure, reverse phase sound is outputted from the outputting portion that corresponds to a seat in which a vehicle occupant, whose degree of awakeness is lower than the predetermined value, sits. Therefore, it can be made such that a vehicle occupant having a low degree of awakeness does not hear noise.

In a sound input/output device for a vehicle relating to a third aspect of the present disclosure, in the first aspect or the second aspect, the information relating to the vehicle periphery includes information regarding a position where the vehicle is traveling.

In the sound input/output device for a vehicle relating to the third aspect of the present disclosure, due to a vehicle occupant speaking toward the sound collecting portion, information regarding the position where the vehicle is traveling is outputted to the vehicle occupant from the outputting portion.

In a sound input/output device for a vehicle relating to a fourth aspect of the present disclosure, in any one of the first aspect through the third aspect, the information relating to the vehicle periphery includes information regarding topography or buildings at a periphery of a position where the vehicle is traveling.

In the sound input/output device for a vehicle relating to the fourth aspect of the present disclosure, due to a vehicle occupant speaking toward the sound collecting portion, information regarding the topography or buildings at the periphery of the vehicle is outputted to the vehicle occupant from the outputting portion.

As described above, in accordance with the sound input/output device for a vehicle relating to the first aspect, the comfort of the vehicle occupants can be ensured.

In accordance with the sound input/output device for a vehicle relating to the second aspect, information can be transmitted effectively to only vehicle occupants who wish to obtain the information.

In accordance with the sound input/output device for a vehicle relating to the third aspect, the vehicle occupant can quickly learn the current position.

In accordance with the sound input/output device for a vehicle relating to the fourth aspect, the vehicle occupant can easily obtain information relating to the topography or buildings that are at the periphery of the vehicle.

BRIEF DESCRIPTION OF THE DRAWINGS

Exemplary embodiments of the present disclosure will be described in detail based on the following figures, wherein.

DETAILED DESCRIPTION

A sound input/output device 10 for a vehicle 12 relating to an embodiment is described with reference to the drawings. Note that the dimensional ratios in the drawings are exaggerated for convenience of explanation, and there are cases in which they differ from actual dimension ratios. Further, arrow FR, arrow UP and arrow RH that are shown appropriately in the respective drawings (FIGS. 2 and 3) to indicate the front direction, the upper direction and the right side in the transverse direction of a vehicle 12, respectively. Hereinafter, when description is given by merely using front, rear, upper, lower, left and right directions, they refer to the front and rear in the vehicle 12 front-and-rear direction, upper and lower sides in the vehicle 12 vertical direction, and left and right when facing forward, unless otherwise specified.

Figure 1:
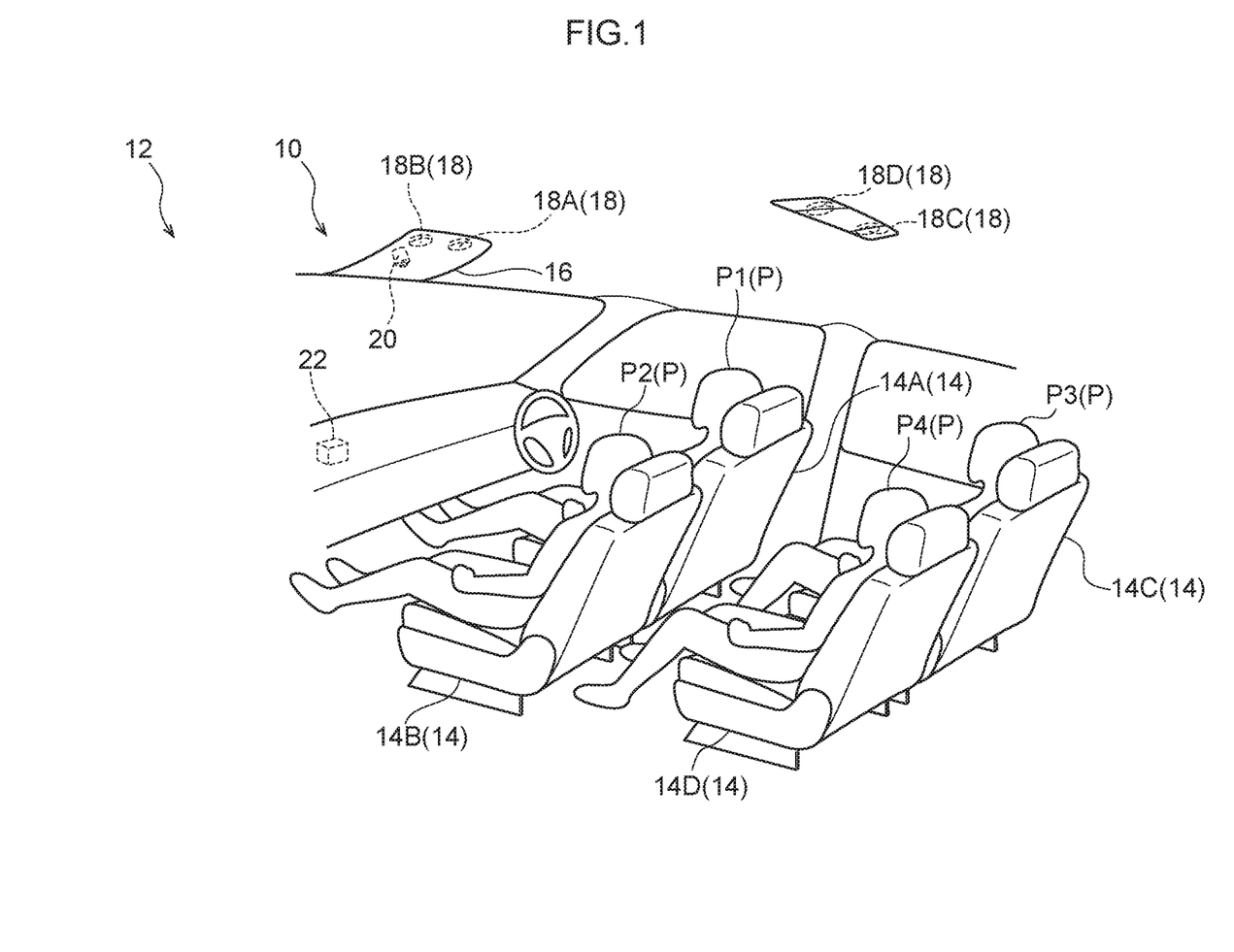
FIG. 1 is a perspective view schematically showing a vehicle cabin interior of a vehicle in which a sound input/output device for a vehicle relating to an embodiment is installed.

As shown in FIG. 1, the sound input/output device 10 for a vehicle 12 of the present embodiment is installed in a vehicle 12. The vehicle 12 is a so-called self-driving car at which self-traveling is possible without a vehicle occupant P piloting the vehicle 12. Autonomous driving is possible due to the situation at the periphery of the vehicle 12 being acquired by sensors. Note that the vehicle 12 of the present embodiment is structured so as to be able to switch between a manual driving mode in which the vehicle occupant P drives the vehicle 12, and an automatic driving mode in which the vehicle 12 is self-traveling.

Figure 3:
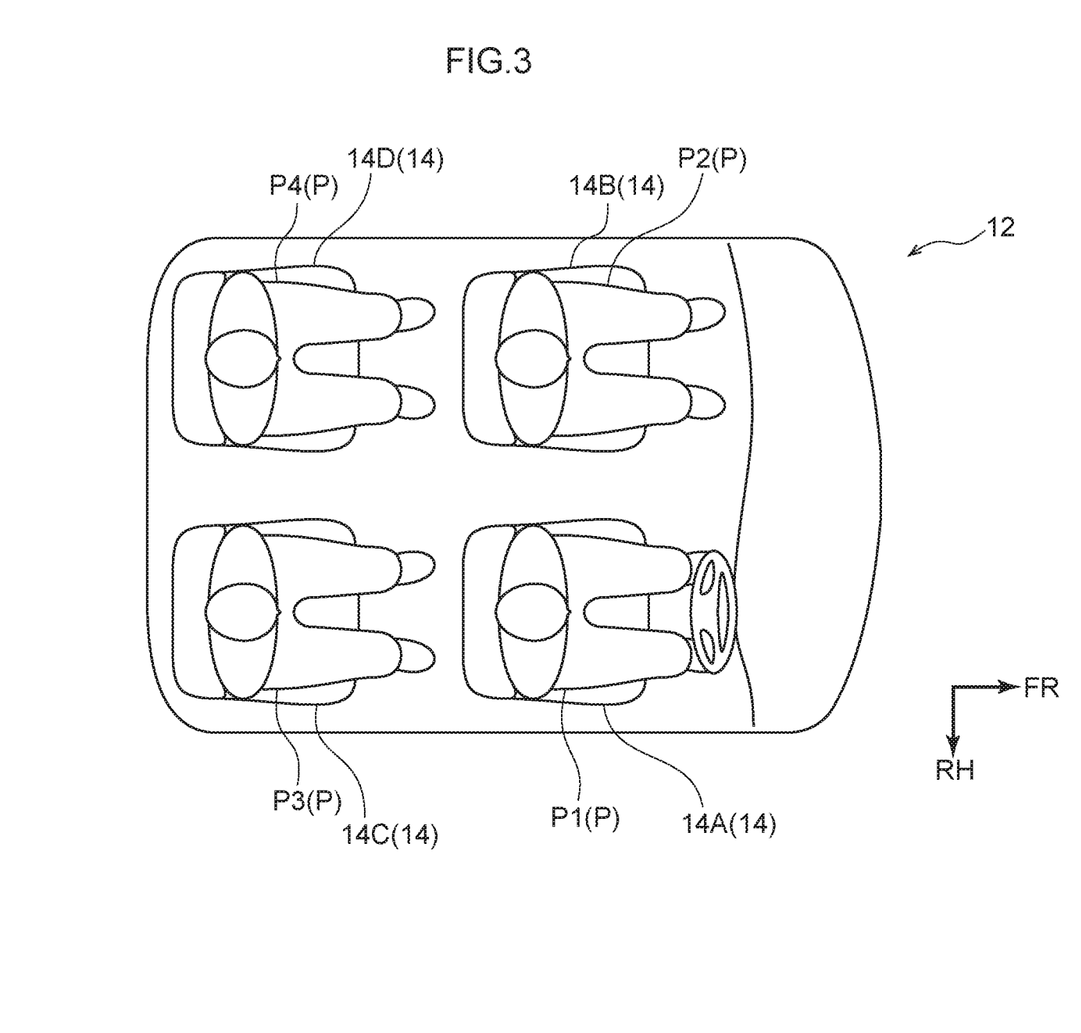
FIG. 3 is a plan view schematically showing the vehicle cabin interior of the vehicle in which the sound input/output device for a vehicle relating to the embodiment is installed.

Plural seats 14 are disposed within the vehicle cabin of the vehicle 12. As shown in FIG. 1 and FIG. 3, as an example, in the present embodiment, four of the seats 14 that are a seat 14A, a seat 14B, a seat 14C and a seat 14D are disposed.

Here, plural sound input/output portions 18 are provided in the ceiling portion of the vehicle 12. In the present embodiment, four of the sound input/output portions 18 which are a sound input/output portion 18A, a sound input/output portion 18B, a sound input/output portion 18C and a sound input/output portion 18D are provided. Each is structured to include a microphone 32 that has directionality and serves as a sound collecting portion, and a speaker 34 that has directionality and serves as an outputting portion (see FIG. 4).

The sound input/output portion 18A and the sound input/output portion 18B are provided in an overhead console 16 that is at an obliquely front upper side of the seat 14A and the seat 14B. The sound input/output portion 18A is directed toward the seat 14A. Namely, a microphone 32A of the sound input/output portion 18A is structured so as to be able to collect the voice spoken by vehicle occupant P1 who is seated in the seat 14A. Further, a speaker 34A of the sound input/output portion 18A is structured so as to be able to output sound to only the vehicle occupant P1.

The sound input/output portion 18B is directed toward the seat 14B. Namely, a microphone 32B of the sound input/output portion 18B is structured so as to be able to collect the voice spoken by vehicle occupant P2 who is seated in the seat 14B. Further, a speaker 34B of the sound input/output portion 18B is structured so as to be able to output sound to only the vehicle occupant P2.

The sound input/output portion 18C and the sound input/output portion 18D are provided at obliquely front upper sides of the seat 14C and the seat 14D. The sound input/output portion 18C is directed toward the seat 14C. Namely, a microphone 32C of the sound input/output portion 18C is structured so as to be able to collect the voice spoken by vehicle occupant P3 who is seated in the seat 14C. Further, a speaker 34C of the sound input/output portion 18C is structured so as to be able to output sound to only the vehicle occupant P3.

The sound input/output portion 18D is directed toward the seat 14D. Namely, a microphone 32D of the sound input/output portion 18D is structured so as to be able to collect the voice spoken by vehicle occupant P4 who is seated in the seat 14D. Further, a speaker 34D of the sound input/output portion 18D is structured so as to be able to output sound to only the vehicle occupant P4.

In addition to the sound input/output portion 18A and the sound input/output portion 18B, an in-cabin camera 20 is provided at the overhead console 16. The in-cabin camera 20 is directed toward the vehicle cabin interior, and is structured so as to be able to capture images of the faces of the vehicle occupants P1 through P4.

Figure 2:
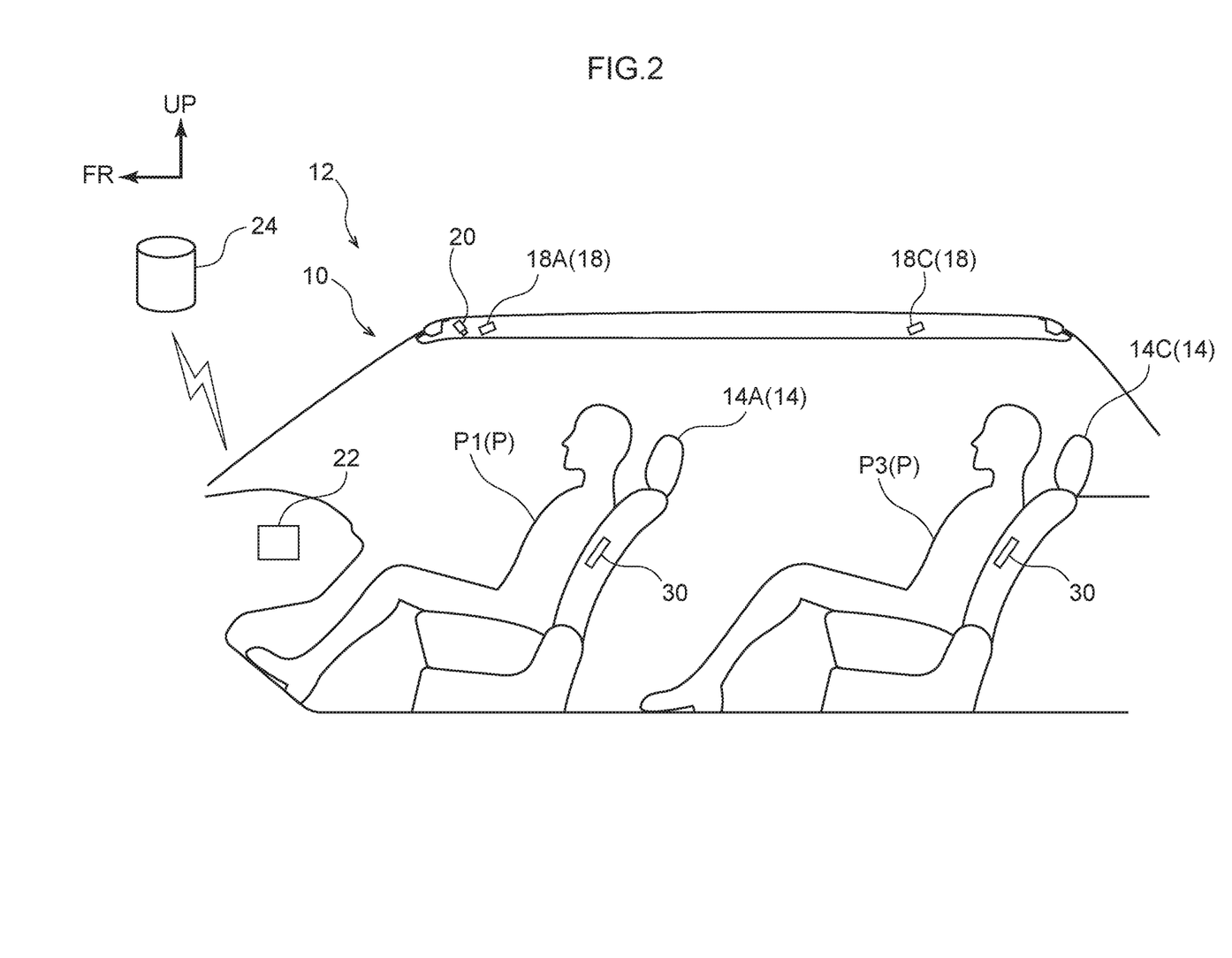
FIG. 2 is a side view schematically showing the vehicle cabin interior of the vehicle in which the sound input/output device for a vehicle relating to the embodiment is installed.

An ECU (Electronic Control Unit) 22 is provided at the front portion of the vehicle 12. The sound input/output device 10 for a vehicle 12 is structured to include the sound input/output portions 18, the in-cabin camera 20 and the ECU 22. As shown in FIG. 2, the ECU 22 is structured so as to be able to connect to a server 24 via a network. Further, a heart rate sensor 30 for sensing the heart rate of the vehicle occupant P1 is provided within the seatback of the seat 14A. Similarly, the heart rate sensor 30 for sensing the heart rate of the vehicle occupant P3 is provided within the seatback of the seat 14C. Note that, although not illustrated, the heart rate sensors 30 are provided respectively at the seat 14B and the seat 14D as well.

Figure 4:
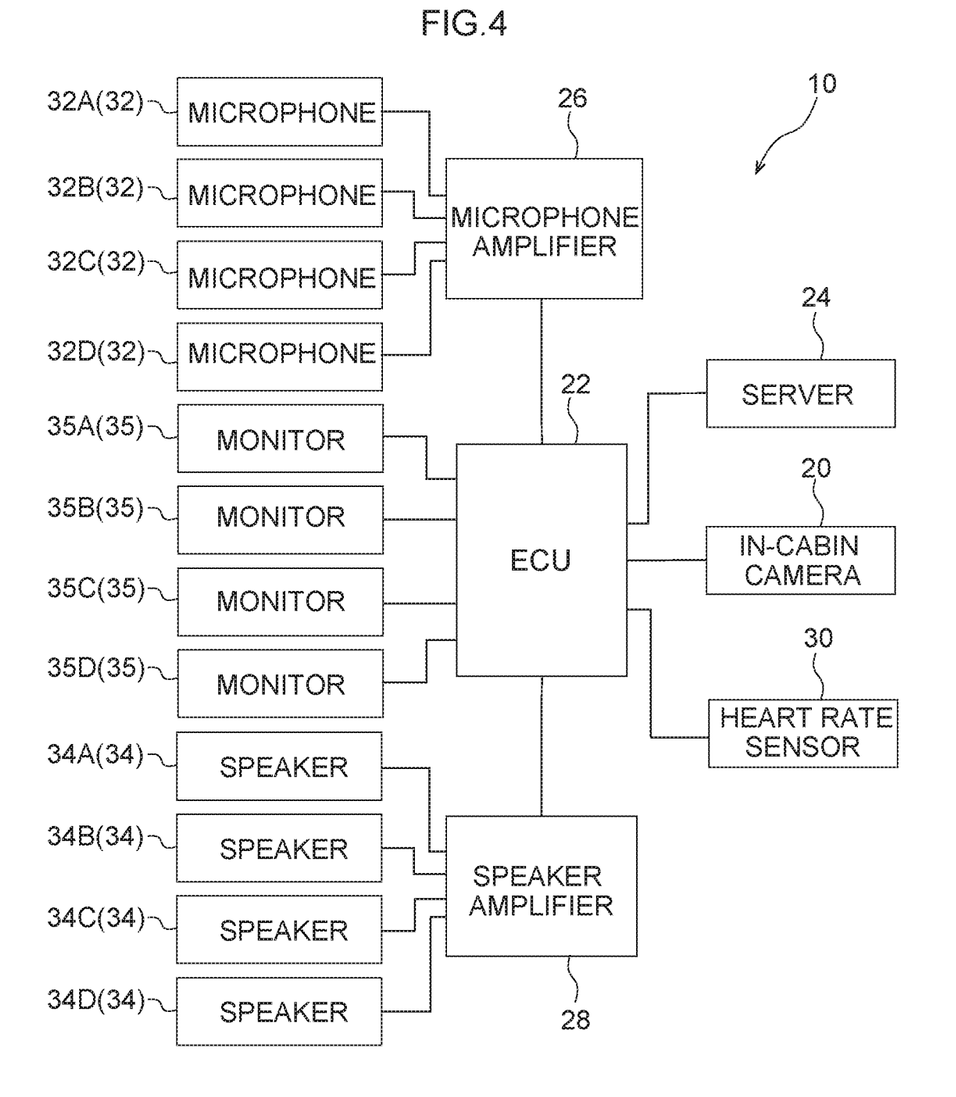
FIG. 4 is a block diagram showing hardware structures of the sound input/output device for a vehicle relating to the embodiment.

FIG. 4 is a block diagram showing the hardware structures of the sound input/output device 10 for a vehicle. As shown in FIG. 4, the sound input/output device 10 for a vehicle is structured to include the ECU 22, a microphone amplifier 26, a speaker amplifier 28, the four microphones 32 (the microphone 32A, the microphone 32B, the microphone 32C, the microphone 32D), four monitors 35 (a monitor 35A, a monitor 35B, a monitor 35C, a monitor 35D), the four speakers 34 (the speaker 34A, the speaker 34B, the speaker 34C, the speaker 34D), the server 24, the in-cabin camera 20, and the heart rate sensors 30.

The microphone 32A is a microphone that structures the sound input/output portion 18A, and is electrically connected to the ECU 22 via the microphone amplifier 26. Similarly, the microphone 32B, the microphone 32C and the microphone 32D are microphones that structure the sound input/output portion 18B, the sound input/output portion 18C and the sound input/output portion 18D respectively, and are electrically connected to the ECU 22 via the microphone amplifier 26.

The speaker 34A is a speaker that structures the sound input/output portion 18A, and is electrically connected to the ECU 22 via the speaker amplifier 28. Similarly, the speaker 34B, the speaker 34C and the speaker 34D are speakers that structure the sound input/output portion 18B, the sound input/output portion 18C and the sound input/output portion 18D respectively, and are electrically connected to the ECU 22 via the speaker amplifier 28.

The monitor 35A is a monitor for displaying images that are outputted from the ECU 22. The monitor 35A is disposed at the periphery of the seat 14A, and is structured so as to display images to the vehicle occupant P1. Similarly, the monitor 35B is disposed at the periphery of the seat 14B, and is structured so as to display images to the vehicle occupant P2.

The monitor 35C is disposed at the periphery of the seat 14C, and is structured so as to display images to the vehicle occupant P3. The monitor 35D is disposed at the periphery of the seat 14D, and is structured so as to display images to the vehicle occupant P4.

The heart rate sensors 30 are devices that sense the heart rates of the vehicle occupants P seated in the seats 14. As described above, the heart rate sensors 30 are built into the seatbacks of the respective seats 14.

Figure 5:
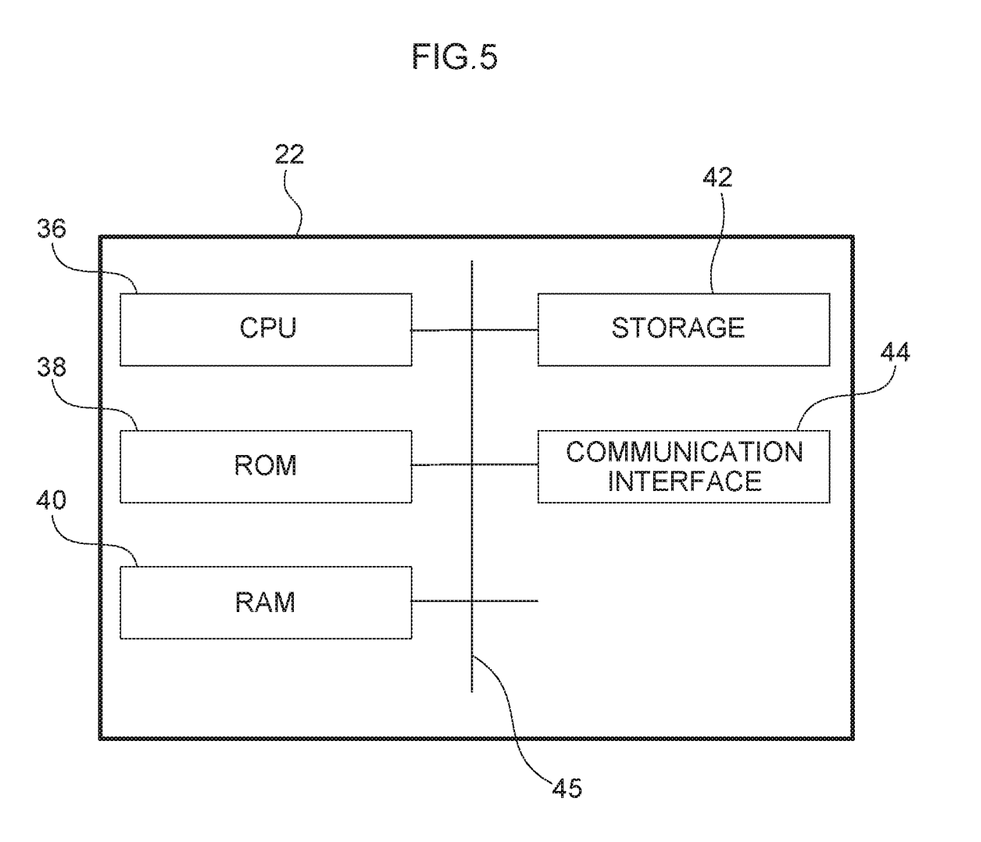
FIG. 5 is a block diagram showing hardware structures of an ECU.

FIG. 5 is a block diagram showing the hardware structures of the ECU 22. As shown in FIG. 5, the ECU 22 is structured to include a CPU (Central Processing Unit: processor) 36, a ROM (Read Only Memory) 38, a RAM (Random Access Memory) 40, a storage 42 and a communication interface 44. These respective components are connected via a bus 45 so as to be able to communicate with one another.

The CPU 36 is the central computing processing unit, and executes various types of programs and controls the respective sections. Namely, the CPU 36 reads-out a program from the ROM 38 or the storage 42, and executes the program by using the RAM 40 as a work space. The CPU 36 carries out control of the above-described respective components and various types of computing processings in accordance with programs that are recorded in the ROM 38 and the storage 42.

The ROM 38 stores various types of programs and various types of data. The RAM 40 temporarily stores programs or data as a work space. The storage 42 is structured by an HDD (Hard Disk Drive) or an SSD (Solid State Drive), and various types of programs including the operating system, and various types of data are stored therein.

The communication interface 44 is an interface for the ECU 22 to communicate with the server 24 and other devices, and utilizes standards such as, for example, the Ethernet®, FDDI, Wi-Fi®, and the like.

The sound input/output device 10 for a vehicle realizes various types of functions by utilizing the above-described hardware resources. The functional structures that are realized by the sound input/output device 10 for a vehicle are explained with reference to FIG. 6.

Figure 6:
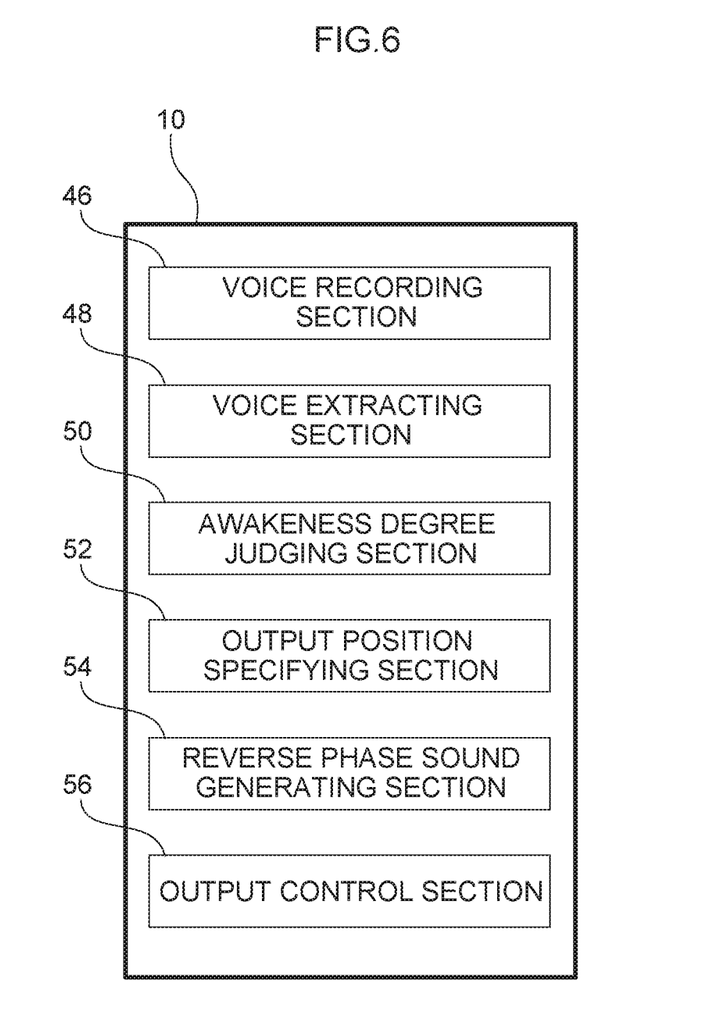
FIG. 6 is a block diagram showing functional structures of the sound input/output device for a vehicle.

As shown in FIG. 6, the sound input/output device 10 for a vehicle is structured to include, as the functional structures thereof, a voice recording section 46, a voice extracting section 48, an awakeness degree judging section 50, an output position specifying section 52, a reverse phase sound generating section 54, and an output control section 56. These respective functional structures are realized by the CPU 36 reading-out and executing programs that are recorded in the ROM 38 and the storage 42.

The voice recording section 46 records voices that are collected by the microphones 32. The voice extracting section 48 extracts specific words from the voices recorded by the voice recording section 46. As words that the voice extracting section 48 extracts, for example, words that include questions relating to the vehicle such as the remaining amount of fuel and the driving status of the vehicle 12 and the like, or words that include questions relating to topography or buildings at the periphery of the position where the vehicle 12 is traveling, are extracted.

The awakeness degree judging section 50 judges the degrees of awakeness of the vehicle occupants P. For example, the awakeness degree judging section 50 judges the awakeness level of the vehicle occupants based on signals from at least one of the in-cabin camera 20 or the heart rate sensors 30. Here, the degree of awakeness being low means that the vehicle occupant P is tending toward sleep.

The output position specifying section 52 specifies the position to which information is to be outputted. For example, the output position specifying section 52 specifies, from among the seat 14A through the seat 14D, the seat(s) 14 to which information is to be outputted.

The reverse phase sound generating section 54 generates reverse phase sound from the voice collected at the microphone 32. The output control section 56 causes a voice to be outputted from the speaker 34 that corresponds to the seat 14 specified by the output position specifying section 52, or causes images to be outputted to the monitor 35 that corresponds to the seat 14 specified by the output position specifying section 52. Note that the output control section 56 may cause a voice to be outputted from the speaker 34 and images to be outputted to the monitor 35.

An example of the flow of voice inputting/outputting processing carried out by the sound input/output device 10 for a vehicle is described next with reference to the flowchart of FIG. 7. The voice inputting/outputting processing is carried out due to the CPU 36 reading-out programs from the ROM 38 and/or the storage 42, and expanding and executing them in the RAM 40.

Figure 7:
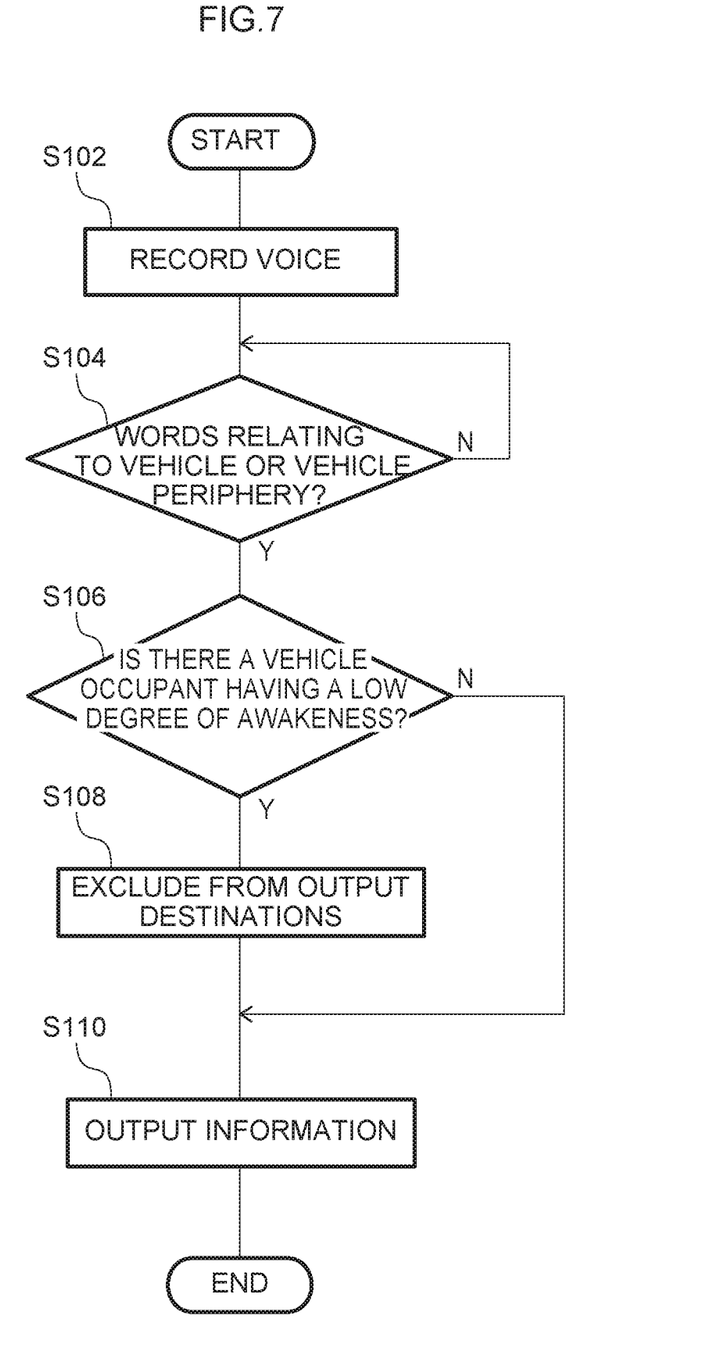
FIG. 7 is a flowchart showing an example of the flow of voice inputting/outputting processing.

As shown in FIG. 7, in step S102, the CPU 36 records a voice by the function of the voice recording section 46. Here, a voice is recorded in a case in which contents spoken by the vehicle occupant P are collected by any of the microphones 32A through 32D.

In step S104, the CPU 36 judges whether or not words relating to the vehicle 12 or to the periphery of the vehicle 12 have been spoken. For example, in a case in which words relating to the vehicle 12 or words relating to the periphery of the vehicle 12 are extracted by the function of the voice extracting section 48 from the voice recorded by the voice recording section 46, the CPU 36 moves on to step S106. Further, if information relating to the vehicle 12 or to the periphery of the vehicle 12 is not extracted, the CPU 36 repeats the processing of step S104 until such information is extracted.

In step S106, the CPU 36 judges whether or not there is a vehicle occupant P having a degree of awakeness that is lower than a predetermined value. For example, if the CPU 36 judges, from the function of the awakeness degree judging section 50 and based on information from at least one of the in-cabin camera 20 and the heart rate sensors 30, that there is a vehicle occupant having a degree of awakeness that is lower than the predetermined value, the CPU 36 moves on to step S108. Further, if it is judged that there is no vehicle occupant whose degree of awakeness is lower than the predetermined value, the CPU 36 moves on to the processing of step S110.

In step S108, the CPU 36 excludes, from the information output destinations, the speaker 34 and the monitor 35 that correspond to the seat 14 in which a specific vehicle occupant P is seated. For example, the CPU 36 excludes, from the information output destinations, the speaker 34 and the monitor 35 that correspond to the seat 14 in which is seated the vehicle occupant P who was judged to have a low degree of awakeness in step S106. For example, in a case in which it is judged that the degree of awakeness of the vehicle occupant P3 in FIG. 1 is low, the CPU 36 makes it such that the output of a voice from the speaker 34C that corresponds to the seat 14C is not carried out. Further, the CPU 36 makes it such that the output of images to the monitor 35C that corresponds to the seat 14C is not carried out.

In step S110, the CPU 36 outputs, by at least one of voice and images and to the seat 14 that is a destination of output, information that pertains to the words relating to the vehicle 12 or the periphery of the vehicle 12 that were extracted by the function of the voice extracting section 48 in step S104. For example, by the function of the output control section 56, the CPU 36 causes a voice to be outputted from the speaker 34 that corresponds to the seat 14 that is set as a destination of output. At this time, the CPU 36 may make it such that images are outputted from the monitor 35 that corresponds to the seat 14 that is set as a destination of output.

As described above, in the present embodiment, information relating to the vehicle 12 or to the periphery of the vehicle 12 is outputted only to the vehicle occupant P whose degree of awakeness judged by the awakeness degree judging section 50 is higher than the predetermined value.

(Operation)

Operation of the present embodiment is described next.

At the sound input/output device 10 for a vehicle 12 of the present embodiment, the output control section 56 controls at least one of the speaker 34 and the monitor 35 to output information that pertains to words relating to the vehicle 12 or the periphery of the vehicle 12 which were extracted by the voice extracting section 48. Due thereto, merely by the vehicle occupant P speaking, without carrying out a special operation, information relating to the vehicle 12 or the periphery of the vehicle 12 can be obtained. For example, in a case in which the vehicle occupant P speaks regarding the driving status of the vehicle 12, the voice relating to the driving status is extracted by the function of the voice extracting section 48. Then, the CPU 36 causes the information regarding the driving status of the vehicle 12 to be outputted from at least one of the speaker 34 and the monitor 35.

Further, in the present embodiment, it is made such that information is not outputted to the vehicle occupant P having a degree of awakeness judged by the awakeness degree judging section 50 is lower than a predetermined value. Namely, information is outputted only to the vehicle occupant P who has a degree of awakeness, which is judged by the awakeness degree judging section 50, that is higher than the predetermined value. Due thereto, disturbing of the vehicle occupant P who has a low degree of awakeness, such as the vehicle occupant P who is sleeping or the like, can be suppressed. As a result, the comfort of the other vehicle occupants P can be ensured.

Although an embodiment has been described above, the present disclosure can of course be implemented in various forms within a scope that does not depart from the gist thereof. For example, in the above-described embodiment, it is made such that information is not outputted to the vehicle occupant P who is judged by the awakeness degree judging section 50 of FIG. 6 to have a degree of awakeness that is lower than a predetermined value. However, the present disclosure is not limited to this. The output control section 56 may cause reverse phase sound to be outputted to the vehicle occupant P who is judged by the awakeness degree judging section 50 to have a degree of awakeness that is lower than the predetermined value.

As an example, reverse phase sound may be generated by the function of the reverse phase sound generating section 54, and the output control section 56 may cause reverse phase sound to be outputted from the speaker 34 that corresponds to the seat 14 in which is seated the vehicle occupant P who has a low degree of awakeness. By doing so, it can be made such that the vehicle occupant P who has a low degree of awakeness cannot hear noise. Due thereto, information can be transmitted effectively to only the vehicle occupants P who wish to obtain the information.

Note that any of various types of processors other than the CPU 36 may execute the processings that the CPU 36 executes by reading out software (programs) in the above-described embodiment. Examples of processors in this case include PLDs (Programmable Logic Devices) such as FPGAs (Field-Programmable Gate Arrays) and the like whose circuit structure can be changed after production, or dedicated electrical circuits such as ASICs (Application Specific Integrated Circuits) and the like that are processors having circuit structures that are designed for the sole purpose of executing specific processings, or the like. Further, the above-described processings may be executed by one of these various types of processors, or may be executed by combining two or more of the same type or different types of processors (e.g., plurals FPGAs, or a combination of a CPU and an FPGA, or the like). Further, the hardware structures of these various types of processors are, for example, electrical circuits that combine circuit elements such as semiconductor elements and the like.

Moreover, although the storage 42 is used as the recording section in the above-described embodiment, the present disclosure is not limited to this. A recording medium such as, for example, a CD (Compact Disk), a DVD (Digital Versatile Disk), a USB (Universal Serial Bus) memory, or the like may be made to be the recording section.

What is claimed is:

1. A sound input/output device for a vehicle, the sound input/output device comprising:
   sound collecting portions that are provided within a vehicle cabin and that collect voices of vehicle occupants;
   outputting portions that are provided within the vehicle cabin, and that output sound or images to respective seats;
   an awakeness degree judging section that judges degrees of awakeness of the vehicle occupants; and
   an output control section that, when it is judged by a voice extraction section, based on a voice collected by the sound collecting portion, that content relating to the vehicle or a vehicle periphery has been spoken, causes information relating to the vehicle or the vehicle periphery to be outputted from each outputting portion that corresponds to a seat in which a vehicle occupant, whose degree of awakeness is higher than a predetermined value, sits, wherein the information relating to the vehicle periphery includes information regarding a position where the vehicle is traveling.

2. The sound input/output device for a vehicle of claim 1, wherein the output control section causes the information relating to the vehicle or the vehicle periphery to be outputted by a voice from each outputting portion that corresponds to a seat in which a vehicle occupant, whose degree of awakeness is higher than the predetermined value, sits, and causes reverse phase sound to be outputted from each outputting portion that corresponds to a seat in which a vehicle occupant, whose degree of awakeness is lower than the predetermined value, sits.

3. The sound input/output device for a vehicle of claim 1, further comprising:
an in-cabin camera that captures images of faces of the vehicle occupants; and
heart rate sensors that sense heart rates of the vehicle occupants,
wherein the awakeness degree judging section judges the degrees of awakeness based on signals from at least one of the in-cabin camera or the heart rate sensors.

4. A sound input/output device for a vehicle, the sound input/output device comprising:
sound collecting portions that are provided within a vehicle cabin and that collect voices of vehicle occupants;
outputting portions that are provided within the vehicle cabin, and that output sound or images to respective seats;
an awakeness degree judging section that judges degrees of awakeness of the vehicle occupants; and
an output control section that, when it is judged by a voice extraction section, based on a voice collected by the sound collecting portion, that content relating to the vehicle or a vehicle periphery has been spoken, causes information relating to the vehicle or the vehicle periphery to be outputted from each outputting portion that corresponds to a seat in which a vehicle occupant, whose degree of awakeness is higher than a predetermined value, sits, wherein the information relating to the vehicle periphery includes information regarding topography or buildings at a periphery of a position where the vehicle is traveling.

5. The sound input/output device for a vehicle of claim 4, wherein the output control section causes the information relating to the vehicle or the vehicle periphery to be outputted by a voice from each outputting portion that corresponds to a seat in which a vehicle occupant, whose degree of awakeness is higher than the predetermined value, sits, and causes reverse phase sound to be outputted from each outputting portion that corresponds to a seat in which a vehicle occupant, whose degree of awakeness is lower than the predetermined value, sits.

6. The sound input/output device for a vehicle of claim 4, further comprising:
an in-cabin camera that captures images of faces of the vehicle occupants; and
heart rate sensors that sense heart rates of the vehicle occupants,
wherein the awakeness degree judging section judges the degrees of awakeness based on signals from at least one of the in-cabin camera or the heart rate sensors.

* * * * *